United States Patent

Skåug

[11] 4,165,582
[45] Aug. 28, 1979

[54] SYSTEM FOR SUPPORTING PLANTS, BUSHES AND SMALL TREES

[76] Inventor: Frank S. Skåug, Langbölgen 23, Oslo 11, Norway

[21] Appl. No.: 854,014

[22] Filed: Nov. 22, 1977

[30] Foreign Application Priority Data

Nov. 26, 1976 [NO] Norway ................................ 764050

[51] Int. Cl.² ............................................. A01G 17/06
[52] U.S. Cl. ........................................... 47/44; 47/47
[58] Field of Search .................... 47/42, 43, 44, 45, 46, 47/47, 70; 24/221, 221 A; 16/87; 211/94, 97, 98, 99; 248/222.2, 222.3, 228, 229, 256, 257, 27.8

[56] References Cited

U.S. PATENT DOCUMENTS

| 2,147,625 | 2/1939 | Brothers | 211/94 |
|---|---|---|---|
| 2,689,103 | 9/1954 | Ackerman | 248/257 |
| 2,876,027 | 3/1959 | Salmonetti | 248/229 X |
| 3,161,263 | 12/1964 | Stokes | 248/222.3 X |
| 3,486,726 | 12/1969 | Kindorf et al. | 248/228 X |
| 3,570,078 | 3/1971 | Newmann et al. | 24/201 |

FOREIGN PATENT DOCUMENTS

| 143659 | 2/1931 | Switzerland | 248/256 |
|---|---|---|---|
| 752211 | 7/1956 | United Kingdom | 47/47 |

*Primary Examiner*—Edgar S. Burr
*Assistant Examiner*—James R. Feyrer
*Attorney, Agent, or Firm*—Haseltine, Lake & Waters

[57] ABSTRACT

A system for supporting plants, bushes and small trees, by the use of per se known channel formed metallic batten or rail with C-formed cross-section suitable for attachment on walls or for insertion into the earth and adapted to take up attaching means on a string which shall suspend or retain the plants and connecting means for the coupling of several rails or profile battens.

4 Claims, 3 Drawing Figures

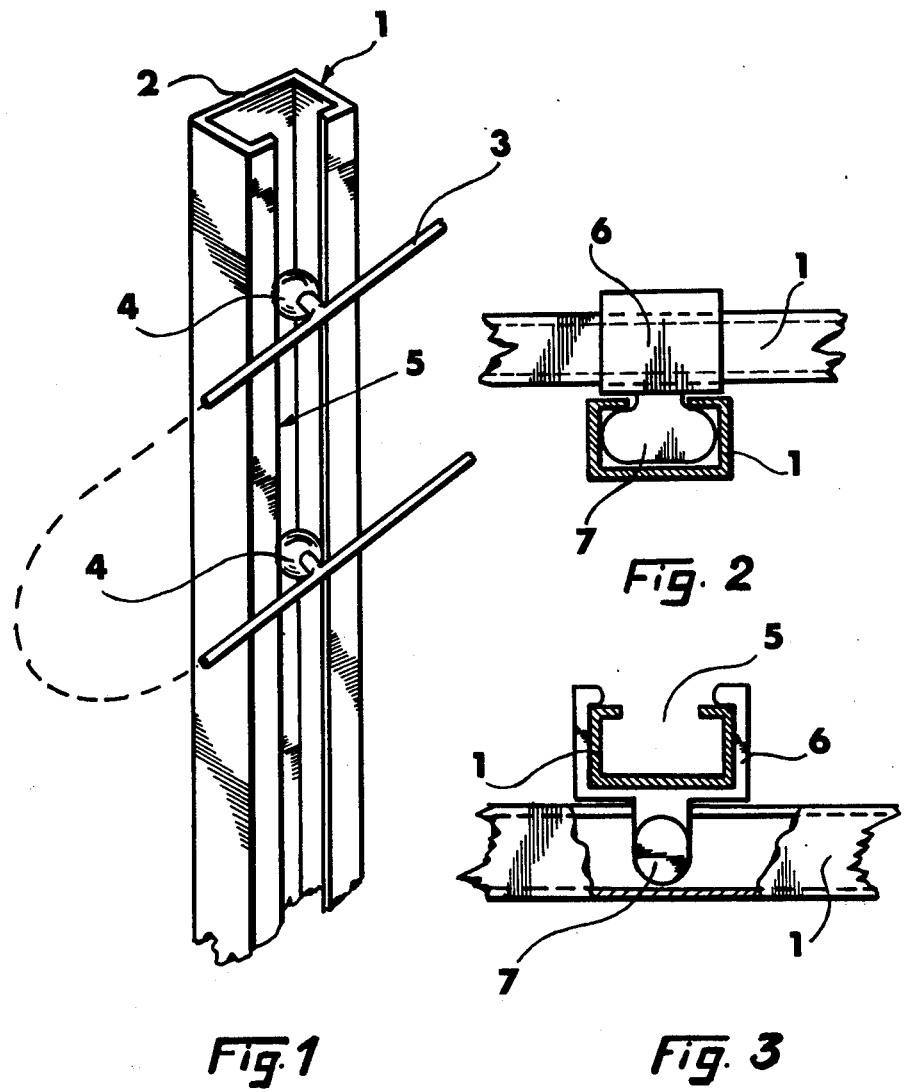

SYSTEM FOR SUPPORTING PLANTS, BUSHES AND SMALL TREES

BACKGROUND OF THE INVENTION

The present invention is related to a system for supporting or suspending plants, bushes and small trees and intended for use in houses, in gardens and so forth. More specifically the invention in its various combination embodiments is suitable for the support of plants on balconies, bushes and small trees in gardens and green houses and plants growing up against walls.

The main purpose of the present invention is to provide a practical means or improvement of the previously used often very complex suspension systems or supporting frames, mostly made of wood and thus very much exposed to damage by the climate.

SUMMARY OF THE INVENTION

The above purpose is obtained with a system in accordance with the invention and characterized by the use of per se known channel formed metallic batten or rail with C-formed cross-section suitable for attachment on walls or for insertion into the earth and adapted to take up attaching means on a string which shall suspend or retain the plants and connecting means for the coupling of several rails or profile battens.

According to another feature of the invention the connecting means has a foot to be inserted into the opening of the C-form and turned 90° for attachment and a head which is gripping around a corresponding profile for clamping of same at an angle to the first profile, possibly for the formation of a trellis. The attaching string is preferably made of an elastic material and has evenly spaced attaching means in the form of expansions which may be pressed through the opening of the C-form for the attachment of the string to the rail or batten. The expansions of the string are provided with a short stem attached to the string so that this may be freely moveable in planes outside the rail or batten.

The invention will better be understood from the following description with reference to the drawing which is showing the system according to the invention.

IN THE DRAWINGS

FIG. 1 shows a simple support with attachment string;

FIGS. 2 and 3 show the connection of two supports of the system for the building of a trellis.

DESCRIPTION OF INVENTION

The system according to the present invention is using per se known metallic rails or battens having C-formed cross-section as shown in the drawing, wherein the rail 1 may be an ordinary and well known embodiment, but which for the purpose of the invention may be reinforced for instance at the back side 2 for better stiffening. This is, however, not shown in the drawing. This known profile may be inserted into the ground and in this case may be provided with a plug or cap at the lower end (not shown). The rail may also be attached to a wall by means of screws through holes in the back-wall 2.

Together with the rail 1 is used an attachment string 3 which with equal spaces is provided with ball formed expansions 4 which may be pressed into the opening 5 of the rail 1 and in this way is slipped in position in order to retain the attachment string 3. The length of the attachment string 3 and the number of attachment means 4 is not critical for the scope of the invention and the string is carried around the one or all plants, bushes, small trees or flowers to be supported or suspended, and will be slipped into the opening 5 of the rail 1 in proper places. The use of the invention for practical purposes thus is very simple.

In accordance with the system of the invention these known rails may also be used to build up a trellis-work on a wall. For this purpose is used a connecting means 6 (see FIGS. 2 and 3). The connecting means 6 is designed for the coupling of several rails at an angle to each other, the connecting means comprising a head which is gripping around a rail 1 and of a foot to be inserted into another rail 1 through the opening of same and to be turned an angle, for instance 90°, for the attachment inside the opening of the rail. The connecting means 6 are preferably made of an elastic material so that the head may be slipped around one rail 1 and retain this. FIG. 2 shows how the foot 7 of the connecting means 6 has been taken up inside one rail 1 and FIG. 3 is showing how the head of the connecting means 6 grips around another rail 1.

It will be understood that the invention is not limited to the embodiment described and shown in the drawing or the embodiment of the single elements of the system.

I claim:

1. An apparatus for supporting articles such as plants, bushes and small trees, employing channel means formed of a C-formed cross-section suitable for attachment on a wall surface, said apparatus comprising: take up attaching means disposed on a elongated member for suspending said articles; and connecting means for the coupling of several rails to form a multiple grouping, said connecting means being further defined by a foot member insertable into the opening of the C-form and rotatable 90° for attachment therein and a head portion for gripping around a corresponding channel profile to cause clamping of same at an angle to the foot member.

2. An apparatus as claimed in claim 1, wherein: said channel means is formed of a metallic batten.

3. An apparatus according to claim 1, wherein: the attaching elongated member is made of an elastic material and is provided with evenly spaced attaching means in the form of expander members which are insertable through a slot opening of the C-form for the attachment of the elongated member to the rail.

4. An apparatus according to claim 3, wherein: the expander members are provided with a short stem attached to the elongated member to permit free movement in planes outside the rail.

* * * * *